March 9, 1971   F. E. HEFFNER ET AL   3,568,436
DUAL SEAL SYSTEM
Filed Feb. 3, 1969

INVENTORS
Francis E. Heffner,
& Richard R. Toepel
C. J. Biskup
ATTORNEY

United States Patent Office 3,568,436
Patented Mar. 9, 1971

3,568,436
DUAL SEAL SYSTEM
Francis E. Heffner, Troy, and Richard R. Toepel, Warren, Mich., assignors to General Motors Corporation, Detroit, Mich.
Filed Feb. 3, 1969, Ser. No. 795,895
Int. Cl. F03g 7/06
U.S. Cl. 60—24    1 Claim

ABSTRACT OF THE DISCLOSURE

A dual seal system for sealing reciprocating rods in a Stirling engine and preventing an interchange of fluid between a crankcase and a work space containing a highly pressurized working fluid includes a flexible rolling diaphragm which forms a physical barrier to the interchange of fluid and a limited leakage seal which acts as a primary sealing element for the working fluid and controls the maximum pressure differential on the diaphragm. Pressure control means fluidly communicating with a chamber between the diaphragm and the limited leakage seal regulate the pressure differential on opposite sides of the diaphragm within a predetermined operating range.

Figure 1:
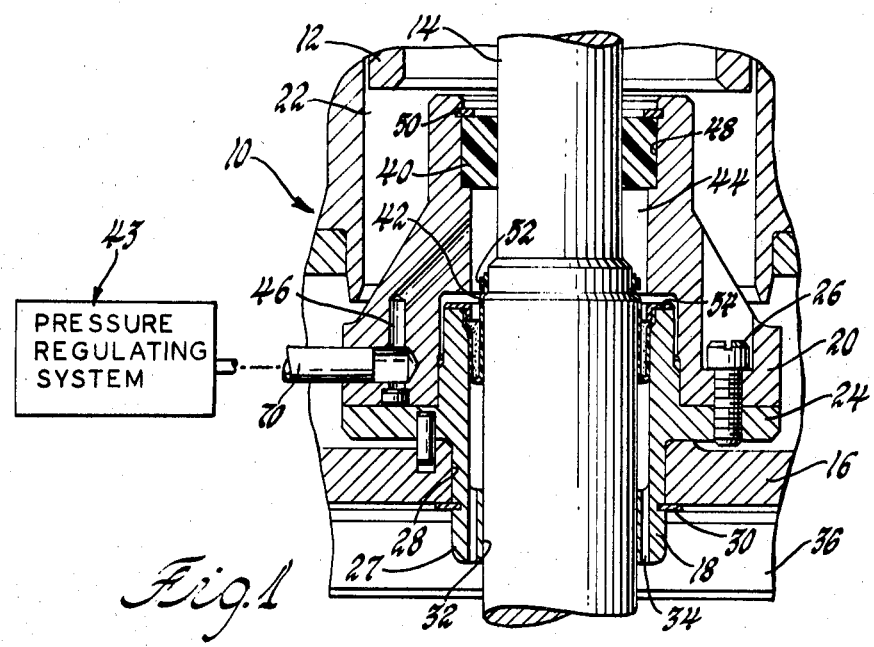

In hot gas engines, such as a Stirling engine, which utilize highly pressurized working fluids for developing mechanical power, it is necessary in most engine configurations to allow one or more reciprocating rods to pass from a work space containing the working fluid to a crankcase maintained at substantially atmospheric pressure. These reciprocating rods must be sealed at the point where they pass from the pressurized to the unpressurized environment in order to prevent leakage of the working fluid and, additionally, to prevent passage of oil or vapor from the crankcase into the working space. Leakage of the working fluid from the engine requires a makeup supply and the additional space, weight, and cost incurred thereby is disadvantageous in most engine applications. The passage of oil and vapor from the crankcase to the working space eventually causes contamination of the working fluid, which in turn, impairs proper engine operation inasmuch as the contaminated fluid has less ideal characteristics than the original pure gas which was selected on the basis of overall suitability for the application. Moreover, after a period of time, the contaminated fluid will react with the surfaces of the engine heat exchanger thereby lowering the heat transfer rates and creating temperature gradients in the engine, both of which cause the engine to perform inefficiently.

To eliminate the above-mentioned interchange of fluids between the crankcase and the working space, it has been proposed to interpose a rolling diaphragm between the relatively reciprocating parts. While such an arrangement establishes a physical barrier to the interchange of fluid, the pressure differential between opposite sides of the diaphragm must be maintained within predetermined design limits to avoid a rupturing of the latter. Thus far, the control has been achieved by using pressurized fluids on the lower surfaces of the diaphragm to counterbalance the pressure of the working fluid. However, inasmuch as the pressure of the working fluid may range as high as 3,000 p.s.i. and the pressure differential on the diaphragm must be controlled between 20 to 100 p.s.i., the necessary control and accessory systems are costly, complex, and space consuming The present invention contemplates overcoming the above problems by providing a reliable and inexpensive arrangement for controlling the aforementioned pressure differential. A reciprocating seal is interposed between the reciprocating members and the diaphragm to form an intermediate chamber between the crankcase and the working space. The leakage past the sail is controlled to establish a large pressure drop between the working space and the intermediate chamber thereby limiting the maximum pressure differential on the diaphragm while continuously pressurizing the intermediate chamber. A control valve having two pressure regulators fluidly communicates with the intermediate chamber and the source of working fluid for the engine. One of the regulators serves to increase the pressure in the intermediate chamber when the pressure differential on the diaphragm drops below a predetermined minimum value. The other regulator serves to vent the intermediate chamber when the pressure differential on the diaphragm is above a predetermined maximum value. In this manner, the pressure differential on the diaphragm can be regulated by the use of a single control valve solely by utilizing the inherent pressures within the working fluid supply system.

Accordingly, it is an object of the present invention to provide a dual seal system for relatively reciprocating members which uses a flexible diaphragm and a limited leakage sealing element to prevent the interchange of fluid between a pressurized fluid chamber and an unpressurized fluid chamber and valve means fluidly connected between the diaphragm and the sealing element to regulate the pressure in the chamber therebetween so as to maintain the pressure differential on opposite sides of the diaphragm within the predetermined limits.

It is another object of the present invention to provide a closed loop controlled pressure sealing system for preventing fluid leakage between a highly pressurized fluid chamber and a low pressure fluid chamber and thereby seal between relatively reciprocating members wherein a flexible diaphragm and a limited leakage sealing element interposed between the members define an intermediate chamber in which the pressure is regulated by a control valve such that the pressure differential on opposite sides of the diaphragm is maintained within predetermined limits, the intermediate chamber and the control valve being fluidly connected in series with the pressurized fluid chamber.

Another object of the present invention is to provide a dual seal system for a Stirling engine wherein the reciprocating rods passing between a working space and a crankcase are physically sealed by a rolling diaphragm and a limited leakage reciprocating seal, the diaphragm and the reciprocating seal forming an intermediate chamber in which the pressure is controlled by means of two pressure regulators so as to maintain a pressure differential on opposite sides of the diaphragm within predetermined values. One of the regulators serves to admit pressurized fluid to the intermediate chamber when the pressure differential on the diaphragm drops below a predetermined minimum value and the other regulator serves to vent the intermediate chamber when the pressure differential on the diaphragm ranges above a predetermined maximum value.

Figure 2:
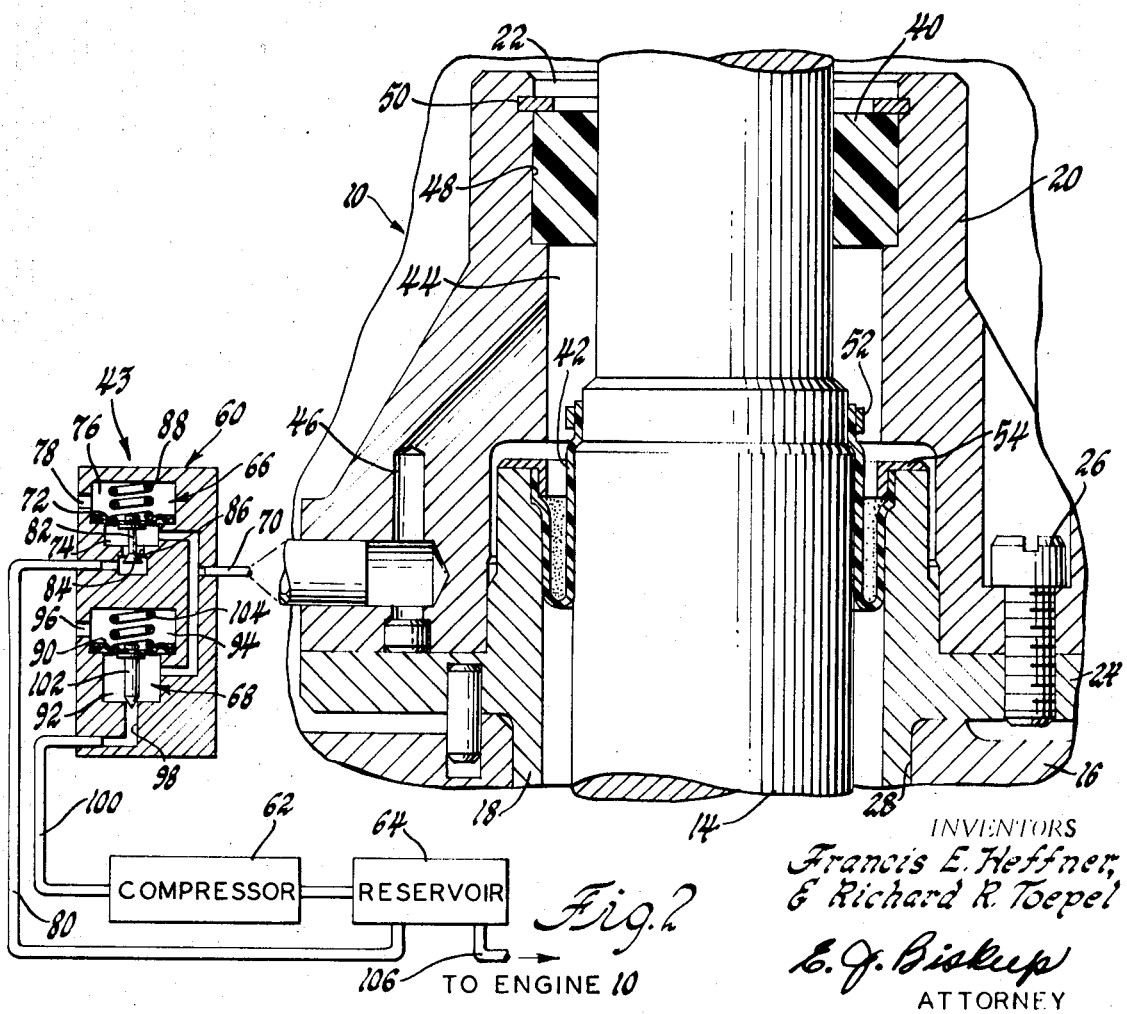

These and other objects will be apparent to one skilled in the art upon reading the following detailed description, reference being made to the accompanying drawings in which:

FIG. 1 is a partial cros-sectional view of a Stirling engine incorporating a dual seal system made in accordance with the present invention; and FIG. 2 is an enlarged view of the dual seal system shown in FIG. 1 including the pressure regulating system.

Referring to FIG. 1, there is shown a Stirling hot gas engine 10 of the double acting type which includes a piston 12 and a piston rod 14. In operation, the opposite ends of the piston 12 are alternately acted upon by a working fluid such as hydrogen, helium, or nitrogen to reciprocate the piston 12 and piston rod 14 relative to a drive housing 16, a guide 18, and a retainer 20. With particular regard to the bottom surface of the piston 12, the latter is acted upon by pressurized working fluid admitted within a working space 22 to drive the piston 12 and the rod 14 upwardly with respect to the stationary components. The upper surface of the piston is alternately acted upon by working fluid admitted within a similar working space to drive the piston 12 and the rod 14 downwardly with respect to the stationary members.

The retainer 20 is fixedly secured to the guide 18 at an annular flange 24 by a plurality of bolts, one of which is identified by the numeral 26. A downwardly depending hub 27 of the guide 18 is fixedly retained within a bore 28 formed in the drive housing 16 by means of a snap ring 30. The piston rod 14 is radially supported by an inwardly extending annular sleeve 32 formed in the hub 27 of the guide 18. The space above the sleeve 32 is vented to a crankcase 36 by ports 34 formed in the hub 27. The lower end of the piston rod 14 extends downwardly into the crankcase 36 and is operably connected to a suitable connecting mechanism (not shown) for delivering output power to a load.

The engine 10 incorporates a closed loop dual seal system comprising a reciprocating seal 40, a flexible rolling diaphragm 42, and a pressure regulating system 43. The seal 40 and the diaphragm 42 form an annular intermediate chamber 44 which is in fluid communication with the regulating system 43 through a port 46 formed in the retainer 20.

Referring to FIG. 2, the seal 40 is retained within a counterbore 48 formed in the upper end of the retainer 20 by means of a snap ring 50. In the preferred embodiment, the seal 40 is in the form of a cylindrical ring and may be formed from a suitable self-lubricating plastic material such as polytetrafluoroethylene. However, the seal 40 may be a clearance seal such as a labyrinth seal in the event a large leakage of working fluid can be tolerated from the working space 22. The seal 40 is adapted to have a limited leakage between the working space 22, which contains working fluid pressurized to approximately 3,000 p.s.i. mean, and the intermediate chamber 44. Preferably, the leaking fluid experiences a pressure decrease to within the optimum pressure operating range for the diaphragm 42. The leaking fluid also serves to continuously pressurize the intermediate chamber 44.

The diaphragm 42 is in the form of a rolling seal having a concave surface facing the chamber 44 and a convex surface facing the crankcase 36. One end of the diaphragm is mechanically and sealingly secured to the piston rod 14 by a retaining sleeve 52 and the other end is mechanically and sealingly secured to the guide 18 by means of a retaining collar 54. The configuration of the diaphragm 42 acts as a positive sealing device to prevent the interchange of fluid between the crankcase 36 and the working space 22. Upon reciprocation of the piston 12 relative to the guide 18, the diaphragm 42 alternately rolls off the outer surface of the piston and onto the cylindrical inwardly facing surface of the guide 18 with a smooth, continuous frictionless motion. All known seals of this type, however, must be operated within controlled pressure differentials. In other words, for satisfactory operation, there is a minimum and maximum positive pressure differential which must exist between the intermediate chamber 44 and the crankcase 36 on opposite sides of the diaphragm 42. In the present invention, the minimum pressure differential ranges around 20 p.s.i. and the maximum pressure differential ranges around 100 p.s.i.

To provide for initial pressurization of the diaphragm 42 and the regulation of the maximum and minimum pressure differentials, the pressure regulating system 43 is provided which comprises a control valve 60, a compressor 62, and a reservoir 64 which is the supply source for the working fluid. The control valve 60 includes two regulators 66 and 68 which are fluidly connected in parallel with intermediate chamber 44 via the port 46 and a conduit 70.

The regulator 66 includes a flexible diaphragm 72 which defines a first chamber 74 in fluid communication with the conduit 70 and a second chamber 76 vented to atmosphere by a port 78. The chamber 74 is fluidly connected to the reservoir 64 by a conduit 80. A valve member 82 is attached at one end to the diaphragm 72 and includes a conical seat 84 at the other end which is adapted to seal an opening 86 to prevent communication between the chamber 74 and the conduit 80. A compression spring 88 is adapted to move the valve member 82 to an open position when the pressure in chambers 74 and 44 drops below a predetermined value corersponding to the minimum operating pressure differential on the diaphragm 42.

The second regulator 68 includes a flexible diaphragm 90 defining a first chamber 92 in fluid communication with the port 46 and the intermediate chamber 44 via the conduit 70 and a second chamber 94 vented to atmosphere by a port 96. The first chamber 92 is additionally in fluid communication with the compressor 62 by a port 98 and a conduit 100. A valve member 102 is attached at the upper end to the diaphragm 90 and has a conical point at the lower end which is adapted to seal the port 98 in a closed position. A compression spring 104 is adapted to maintain the valve member 102 in the closed position until the pressure in the chambers 92 and 44 exceeds a predetermined value corresponding to the maximum operating pressure differential on the diaphragm 42. Under these conditions, the compressor 62 serves to pressurize the fluid vented from chamber 44 and return it as working fluid to the reservoir 64 which, in turn, supplies the working fluid to the engine 10 and the working space 22 via conduit 106. Thus, it will be appreciated that the above-described system forms a closed loop arrangement wherein the fluid leaking from the working space 22 is returned under controlled operating conditions.

In operation, if pressure in the intermediate chamber 44 is such that the pressure differential on opposite sides of the diaphragm 42 is below the minimum operating value, the valve member 82 moves to an open position and pressurized fluid from the reservoir 64 is supplied to chamber 44 via conduits 80, 70, and port 46 until the pressure differential on the diaphragm 42 is within the optimum operating range. In the event the pressure in the intermediate chamber 44 creates a pressure differential on opposite sides of the diaphragm 42 greater than the maximum operating value, the valve member 102 moves to an open position and the fluid within chamber 44 is vented to the compressor 62 via the port 98 and conduit 100 until the pressure differential on the diaphragm 42 is within the optimum operating range.

Although only one form of this invention has been shown and described, other forms will be readily apparent to those skilled in the art. Therefore, it is not intended to limit the scope of this invention by the embodiment selected for the purpose of this disclosure but only by the claim which follows.

What is claimed is:

1. In a Stirling engine having highly pressurized working fluid supplied from a fluid reservoir to a working space, a closed loop controlled pressure sealing system for sealing reciprocating rods passing between said working space and a crankcase maintained at substantially atmospheric pressure and thereby preventing leakage of said working fluid, comprising: a flexible rolling diaphragm having a concave surface facing said working space and a convex surface facing said crankcase, said diaphragm having a pair of ends respectively mechanically and sealingly secured to said engine and said rod to establish a physical barrier to the interchange of fluid between said working space and said crankcase when the opposite surfaces thereof experience a pressure differential between a minimum and a maximum value; a limited leakage seal member connected to the engine between said working space and said diaphragm and forming with the latter an intermediate chamber said limited leakage seal member having a surface sealingly engaging said rod that permits controlled flow of fluid from said working space to said intermediate chamber to establish a large pressure drop thereacross thereby controlling the maximum pressure differential on said diaphragm while continuously pressurizing the intermediate chamber and providing initial pressurization of said diaphragm above said minimum value; pressure control means for controlling said pressure differential between said maximum and minimum values solely by regulating the pressure in said intermediate chamber including a first regulator and a second regulator fluidly connected in parallel between said intermediate chamber and said fluid reservoir, said first regulator operating to exhaust fluid from said intermediate chamber when the pressure differential on said diaphragm is greater than said maximum value, said second regulator operating to supply fluid from said fluid reservoir to said intermediate chamber when the differential on said diaphragm is below said minimum value thereby effecting pressure control by utilizing the inherent pressures with the engine fluid supply system.

References Cited
UNITED STATES PATENTS

| | | | |
|---|---|---|---|
| 2,567,479 | 9/1951 | Hebard | 277—3 |
| 3,074,728 | 1/1963 | Freed | 277—3 |
| 3,088,744 | 5/1963 | Ezekiel et al. | 277—3 |
| 3,277,795 | 10/1966 | Rietdijk | 92—99X |
| 3,302,392 | 2/1967 | Fokker et al. | 92—83 |
| 3,314,594 | 4/1967 | Rietdijk | 92—60X |
| 3,372,624 | 3/1968 | Rietdijk | 60—24 |
| 3,471,156 | 10/1969 | Byrns et al. | 277—3 |

MARTIN P. SCHWADRON, Primary Examiner

L. J. PAYNE, Assistant Examiner

U.S. Cl. X.R.

92—165; 277—28